No. 781,216. PATENTED JAN. 31, 1905.
H. B. MERANDA.
HARVESTER REEL.
APPLICATION FILED APR. 18, 1904.
2 SHEETS—SHEET 2.
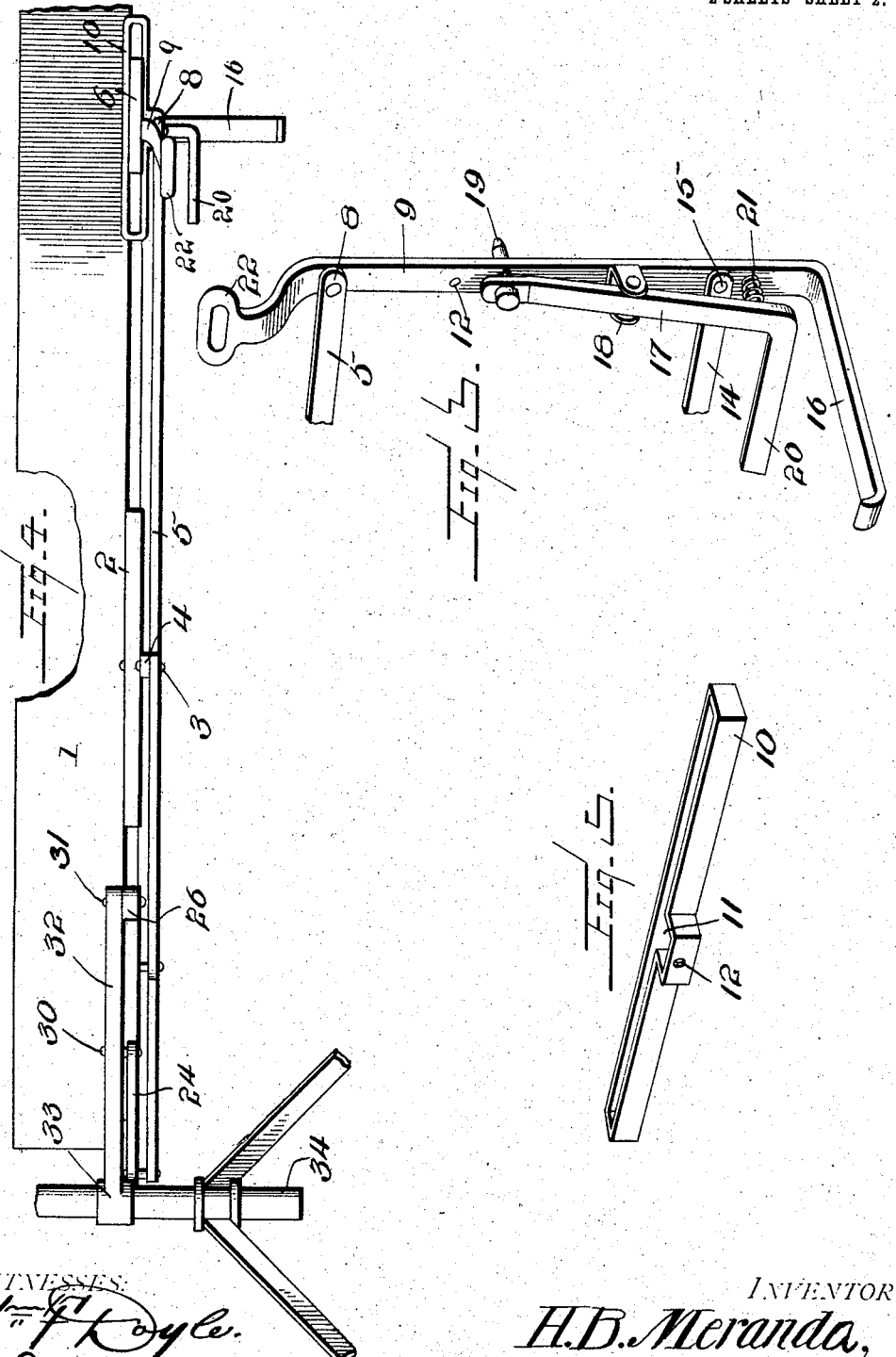
INVENTOR
H. B. Meranda,
By
Shepherd & Parker Attorneys.
WITNESSES:
Wm F Doyle.
L. L. Morrill No. 781,216. Patented January 31, 1905.

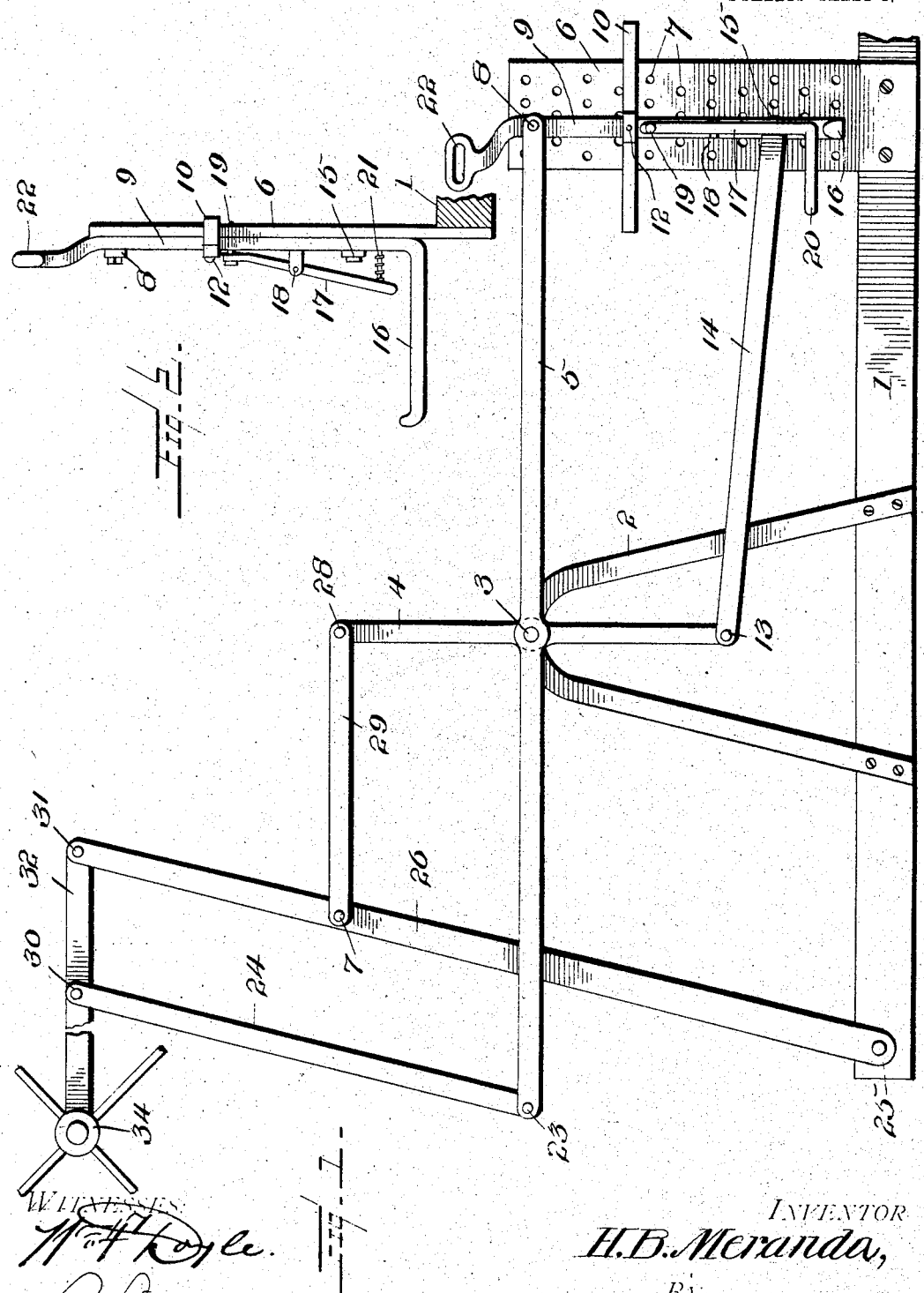

UNITED STATES PATENT OFFICE.

HARRY B. MERANDA, OF HIGGINSPORT, OHIO.

HARVESTER-REEL.

SPECIFICATION forming part of Letters Patent No. 781,216, dated January 31, 1905.

Application filed April 18, 1904. Serial No. 203,678.

*To all whom it may concern:*

Be it known that I, HARRY B. MERANDA, a citizen of the United States, residing at Higginsport, in the county of Brown and State of Ohio, have invented a certain new and useful Improvement in Harvester-Reels, of which the following is a specification.

My invention relates to harvesters, and has for its object to provide a device for the adjustment of harvester-reels adapted to be conveniently adjusted by the foot of the operator to various heights from and in a backward and forward relation to the sickle.

With this and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a side elevation of my complete invention mounted in operative position. Fig. 2 is an end elevation, and Fig. 3 is a perspective view, of the foot-lever-operating device. Fig. 4 is a top plan view, and Fig. 5 is a perspective detail view, of the lever-retaining guide.

In the drawings like reference-numerals designate corresponding parts throughout the several views.

To the foot-board 1 or other convenient portion of a harvester I attach an upright support 2, preferably arched in form, and to the upper part 3 thereof I fulcrum a lever 4, normally approximately vertical in position, and lever 5, normally approximately horizontally disposed. The horizontal lever extends forwardly of upright 2 and also rearwardly to the center line of an upright 6, secured to the foot-board 1 and preferably in the form of an upstanding elongated rectangle perforated by a plurality of holes 7, transverse to its plane of greatest dimensions.

To the rearward end 8 of the horizontally-disposed lever 5 I pivotally secure foot-lever 9, held operatively adjacent to upright 6 by a retaining guide-yoke 10, rigidly secured to such foot-lever by a bolt at 12 in the offset portion 11. This guide-yoke loosely embraces upright 6, permitting a restricted movement of lever 9 upon the face of upright 6.

To the lower end 13 of vertical lever 4 I pivotally secure connecting-rod 14, extending rearwardly and pivotally connected at its rearward end 15 with foot-lever 9, near the lower end thereof.

At the lower end of foot-lever 9 I form a right-angular foot-rest projection 16, and above and adjacent thereto I mount a spring-pressed pawl-lever 17, fulcrumed to lever 9 in a clip 18 and carrying at its upper end a pin or pawl 19, adapted to pass through an opening in lever 9 and engage holes 7 in upright 6.

The lower end of pawl-lever 17 is bent to form a right-angular forwardly-extending portion 20, conveniently disposed to receive pressure from the toe of operator's foot to throw pawl 19 out of engagement with holes 7 and which is returned and held in engagement with such holes by spring 21.

The upper end of lever 9 I curve outwardly to give it clearance from upright 6 and form a handhold 22 therein, by the use of which the hand may be used when desired to assist the foot in operating the shifting device.

Upon the forward end 23 of lever 5 I pivotally mount brace-rod 24, disposed upwardly, inclined somewhat from the vertical, and upon the forward end 25 of foot-board 1 I pivotally mount another brace-rod 26, also disposed upwardly and approximately parallel with and rearward of the rod 23 and pivotally connected at an intermediate point 27 with the upper end 28 of lever 4 by connecting-rod 29.

Upon the upper end 30 of brace-rod 24 and the upper end 31 of brace-rod 26 I mount reel-arm 32, approximately horizontal and carrying journaled in its forward end 33 the usual reel member 34, adapted to be rotated in any desired manner, as by a chain and sprocket. (Not shown.)

The operation of my device is as follows: Considering the parts relatively disposed as shown in Fig. 1, which I will call "normal," and it being desired to drop the reel to accommodate short grain, pressure is exerted by the foot on extension 20 of pawl-lever 17 against the pressure of spring 21 and through the medium of the fulcrum at 18, disengaging pawl 19 from holes 7 in upright 6. This leaves the entire foot adjusting mechanism (shown in detail in Figs. 2 and 3) free from engagement with upright 6, except through the medium of retaining yoke or guide 10, embracing upright 6, which allows a restricted movement of lever 9 upon the face of upright 6. The foot adjusting mechanism being thus disengaged from upright 6, the weight of the reel 34, acting upon arm 32, exerts pressure on connecting-rod 24, depressing end 23 of lever 5 and obviously raising end 8 thereof, and therewith foot-lever 9, pivotally secured thereto. When the desired depression of reel 34 has been accomplished, pressure on foot extension 20 is removed and spring 21 exerts pressure on lever 17, forcing pin 19 to enter one of the holes 7, thereby securing the pin 19 in its new position. Should it be desired to raise the reel, the same method of releasing the lever 9 is of course employed; but pressure is exerted downward by the foot on extended portion 16, thereby depressing lever 9 and raising reel 34, it being retained in its new position the same as before mentioned. In case it is desired to shift the reel forward to pick up the grain lodged away from the machine, or backward to lay upon the apron grain lodged toward the machine, foot-lever 9 is disengaged from upright 6, as formerly; but instead of an upward or downward movement thereof the lower end of foot-lever 9 is thrown forward to draw the reel backward, and vice versa, such movements being accomplished by the interposition of lever 4, acted on by connecting-rods 14 and it in turn acting on connecting-rod 29, throwing brace-rod 26, to which it is pivotally connected, and its parallel brace-rod 24 nearer to or farther from the vertical, thereby throwing the reel-arm 32 and the reel 34 backward or forward. It is of course obvious that a motion of the reel other than described may be accomplished with one movement of the foot, as the reel may be given a downward-and-forward movement or downward-and-backward movement or an upward movement, accompanied by a variation either way from the vertical. When desired to assist the foot in operating the reel, the operator may grasp handle 22 with the hand; but this will generally not be necessary.

I am aware that devices for shifting harvester-reels have been made wherein the retaining-pawl is pressed out of engagement with the rigid member by the foot; but I am not aware that any such shifting device has been invented wherein the pawl is released and the shifting accomplished by the use of one foot only and in the same operation.

While I have referred to lever 5 as horizontally disposed, lever 4 as vertically disposed, and brace-rods 24 and 26 as disposed parallel with each other, it will be understood that such parts assume such positions only in what I have called the "normal" position, as shown in Fig. 1, and that any adjusting movement of lever 9 changes such relative positions.

Having thus described my invention, what I claim as novel, and desire to secure by Letters Patent, is—

1. A device of the character described, comprising in combination a reel, reel-supporting braces, a rigid upright, a plurality of holes formed in such upright, a vertically-disposed foot-lever held by a yoke in slidable relation to such upright and capable of movement in any direction and conveniently disposed for operation by the foot and a plurality of horizontally-disposed levers connecting said foot-lever and reel-supporting braces adapted for the adjustment of the reel.

2. A device of the character described, comprising in combination a reel, reel-supporting braces, a rigid upright, having a plurality of holes formed therein, a vertically-disposed foot-lever held by a yoke in slidable relation to such upright movable in any direction in a plane adjacent to and parallel with its plane and disposed conveniently for operation by the foot and a plurality of horizontally-disposed levers connecting said foot-lever and reel-supporting braces and adapted for the adjustment of the reel.

3. A device of the character described, comprising in combination a reel, reel-supporting braces, a rigid upright, having a plurality of holes formed therein, a vertically-disposed foot-lever held by a yoke in slidable relation to such upright and movable in any direction in a plane adjacent to and parallel with its plane, a spring-pressed pawl carried by such lever, adapted to engage any one of the holes in said upright, and both lever and pawl disposed conveniently for operation by the foot and a plurality of horizontally-disposed levers connecting said foot-lever and reel-supporting braces and adapted for the adjustment of the reel.

4. A device of the character described, comprising in combination a rigid upright, having a plurality of holes formed therein, a foot-lever held by a yoke in slidable relation to such upright, movable in any direction in a plane adjacent to and parallel with its plane, a reel and means comprising a plurality of levers and supporting-braces connecting the foot-lever and the reel whereby the adjustment of the foot-lever, adjusts the reel and means for adjustably securing the foot-lever to the upright by mechanism adapted to engage with the holes thereof.

5. A device of the character described, comprising in combination a rigid upright having a plurality of holes formed therein, a foot-lever held by a yoke in slidable relation to such upright, and movable in any direction in a plane adjacent to and parallel with its plane, a spring-pressed pawl carried by such lever, adapted to engage any one of the holes in said upright, and both lever and pawl disposed for convenient operation by the foot, a reel and means comprising a plurality of supporting-braces and horizontally-disposed levers connecting the foot-lever and the reel whereby the adjustment of the foot-lever, adjusts the reel.

6. A device of the character described comprising in combination an upright, having a plurality of holes formed therein, transverse to its plane of greatest dimension, a lever held by a yoke in slidable relation to such upright and movable in a plane adjacent to and parallel with its plane, a spring-pressed pawl carried by such lever adapted to engage any one of the holes in said upright, and both lever and pawl disposed for convenient operation by the foot, a support disposed forward of and in plane with said upright, a lever fulcrumed at an intermediate point upon such support and disposed approximately horizontal, its rearward end pivotally connected with said foot-operated lever, its forward end carrying a brace-rod pivotally connected therewith, a reel-arm fulcrumed upon such brace, a lever fulcrumed at an intermediate point upon said support and disposed approximately vertical, its lower end pivotally connected to a rod which in turn is pivotally connected with the foot-operated lever at its other end, a brace-rod pivotally engaging the reel-carrying arm and a rod pivotally connecting such brace-rod with the upper end of such vertically-disposed lever and all so disposed that an adjustment of the foot-operated lever, adjusts the reel.

7. In a device of the character described, the combination of a reel, a reel-carrying arm, a pair of upwardly-disposed brace-rods supporting said reel-arm, a lever intermediately fulcrumed and horizontally disposed, the forward end supporting one of said upwardly-disposed brace-rods, a lever intermediately fulcrumed and vertically disposed, a connecting-rod pivotally connecting the upper end of said vertical lever and the other upwardly-disposed brace-rod, a foot-lever engaging the rearward end of the horizontally-disposed lever and a rod pivotally connecting the lower end of said vertical lever and the foot-lever.

HARRY B. MERANDA.

In presence of—
  JOE H. WINTERS,
  CHAS. PABST.